United States Patent [19]
Druse, Sr.

[11] Patent Number: 5,277,537
[45] Date of Patent: Jan. 11, 1994

[54] BALE CARRIER

[76] Inventor: Charles R. Druse, Sr., Box 40, Cambridge, Nebr. 69022

[21] Appl. No.: 861,062

[22] Filed: Mar. 31, 1992

Related U.S. Application Data

[63] Continuation-in-part of Ser. No. 704,053, May 22, 1991, Pat. No. 5,123,800.

[51] Int. Cl.$^5$ .............................................. B60P 1/24
[52] U.S. Cl. ............................ 414/470; 298/8 R; 298/18; 414/24.5
[58] Field of Search ............ 105/278; 280/404; 296/6; 298/8R, 17.6, 17.7, 18; 414/24.5, 470

[56] References Cited

U.S. PATENT DOCUMENTS

| | | | |
|---|---|---|---|
| 2,032,840 | 11/1931 | Flowers | 298/18 |
| 3,826,515 | 7/1974 | Slayton | 280/106 T |
| 4,092,050 | 5/1978 | Sobeck | 298/18 |
| 4,138,159 | 2/1979 | Hall | 298/18 |
| 4,261,676 | 4/1981 | Balling, Jr. | 414/24.5 |
| 4,411,572 | 10/1983 | Hostetler | 414/24.5 |
| 4,470,747 | 9/1984 | Tichenor | 414/491 |
| 4,500,242 | 2/1985 | Beikman | 414/24.5 |
| 4,580,843 | 4/1986 | Lund | 298/18 |
| 5,076,752 | 12/1991 | Rader | 414/470 |

Primary Examiner—Michael S. Huppert
Assistant Examiner—Janice Krizek
Attorney, Agent, or Firm—Zarley, McKee, Thomte, Voorhees & Sease

[57] ABSTRACT

A bale carrier having first and second rows of bale cradles pivotally mounted thereon and which are moveable between bale supporting positions and bale dumping positions. A plurality of first safety latches are mounted on the carrier adjacent one of the rows of bale cradles. A plurality of second safety latches are mounted on the carrier adjacent the second row of bale cradles. A plurality of third and fourth safety latches are mounted on the carrier adjacent the first and second rows of bale cradles. The first safety latches are operatively interconnected so that all of the first safety latches may be simultaneously moved together between latched and unlatched positions. The second safety latches are also operatively interconnected so that all of the second safety latches may be simultaneously moved together between their latched and unlatched positions. In order to dump a hay bale from one of the cradles on the first row, the first safety latches are moved to their unlatched position and the appropriate third latch is moved to its unlatched position so that that particular bale cradle may be moved to its dumping position. When it is desired to dump a bale from the second row, the second safety latches are moved to their unlatched positions with the appropriate fourth safety latch being moved to its unlatched position so that the hay bale on that particular bale cradle may be dumped therefrom.

5 Claims, 7 Drawing Sheets

BALE CARRIER

CROSS REFERENCE TO RELATED APPLICATION

This is a continuation-in-part application of application, Ser. No. 07/704,053 entitled "A BALE CARRIER," filed May 22, 1991, now U.S. Pat. No. 5,123,800.

BACKGROUND OF THE INVENTION

Many types of apparatuses have been previously provided for carrying or transporting large round hay bales. In the co-pending application, an improved bale carrier was provided. In the bale carrier of the co-pending application, a bale carrier is disclosed which has the capability of dumping bales from either side of the wheeled frame means. Although the bale carrier of the co-pending application represented a significant advance in the art, only a single row of bales could be carried on the bale carrier since it was desirable to dump the bales from either side of the wheeled frame means.

SUMMARY OF THE INVENTION

A bale carrier is described which comprises a wheeled frame means having a forward end, a rearward end, and opposite sides. A first row of bale cradles is selectively pivotally mounted, about a horizontal axis, on the frame means on one side thereof. A second row of bale cradles is selectively pivotally mounted, about a horizontal axis, on the frame means at the other side thereof. Each of the bale cradles in the first row is selectively pivotally movable from a normal bale supporting position to a first dumping position so that the hay bale thereon may be dumped therefrom along one side of the frame means. Each of the bale cradles in the second row is selectively pivotally movable from a normal bale supporting position to a first dumping position so that the hay bale thereon may be dumped therefrom along the other side of the frame means.

A plurality of first safety latches are mounted on the frame means adjacent the first row of bale cradles which are movable between unlatched and latched positions. A plurality of second safety latches are also mounted on the frame means adjacent the second row of bale cradles which are also movable between unlatched and latched positions. A plurality of third and fourth safety latches are mounted on the frame means adjacent the first and second rows of bale cradles respectively and are movable between latched and unlatched positions. The first safety latches are operatively interconnected so that all of the first safety latches may be simultaneously moved together between their latched and unlatched positions. The second safety latches are operatively interconnected so that all of the second safety latches may be simultaneously moved together between their latched and unlatched positions.

When the bale carrier is transporting the bales between locations, the first, second, third and fourth safety latches will be in their latched positions. When it is desired to dump the bales from the first row of bale cradles, the first safety latches are moved to their unlatched positions. The operator individually unlatches each of the third safety latches as it is desired to dump a bale from one of the individual cradles on the first row of bales. Similarly, when it is desired to dump bales from the second row of bale cradles, the second safety latches are moved to their unlatched positions. The operator individually unlatches each of the fourth safety latches to facilitate the dumping of the bales from the cradles in the second row.

It is therefore a principal object of the invention to provide an improved bale carrier.

Yet another object of the invention is to provide a bale carrier wherein two rows of bales are carried on the bale carrier in an end-to-end relationship.

Yet another object of the invention is to provide an improved bale carrier including safety latch means to positively ensure that the bales will not be inadvertently dumped therefrom.

DESCRIPTION OF THE PREFERRED EMBODIMENT

Figure 1:
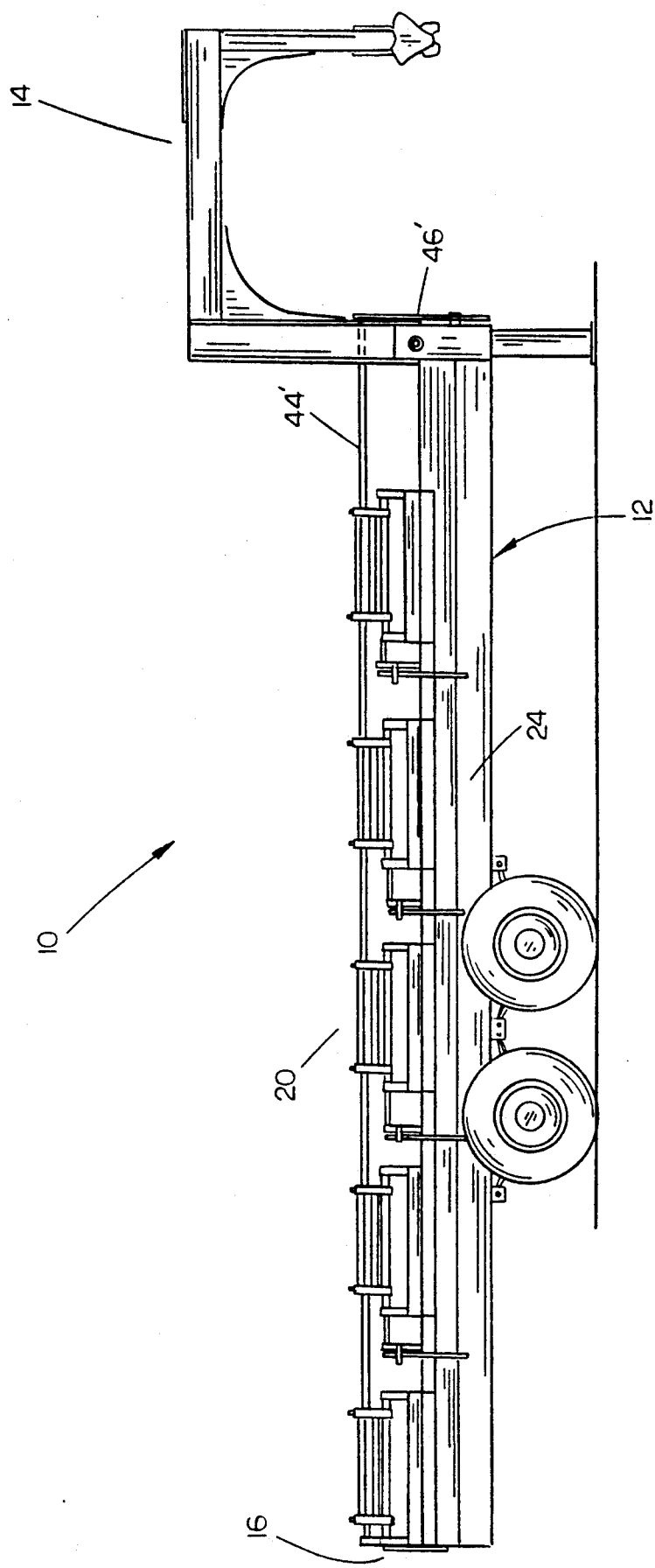
FIG. 1 is a side view of the bale carrier of this invention.
Figure 2:
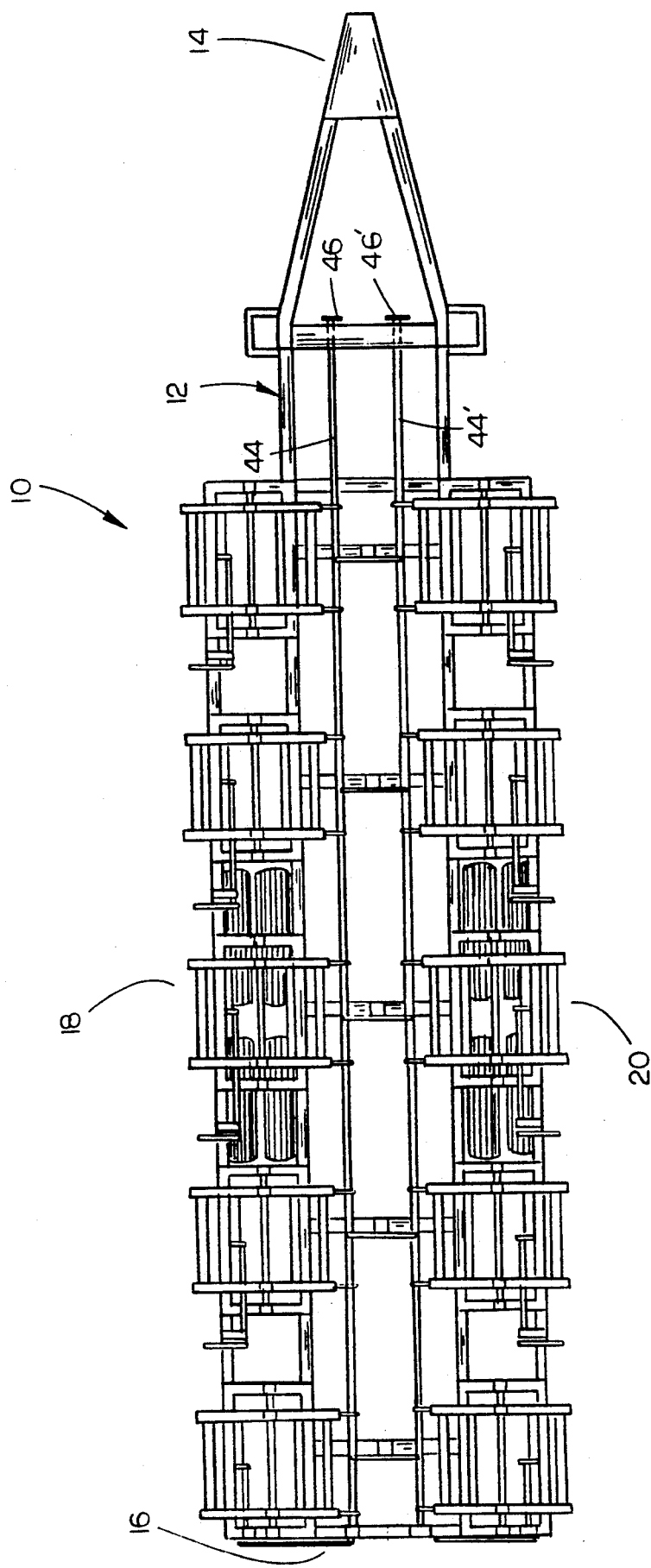
FIG. 2 is a top view of the bale carrier of this invention.
Figure 3:
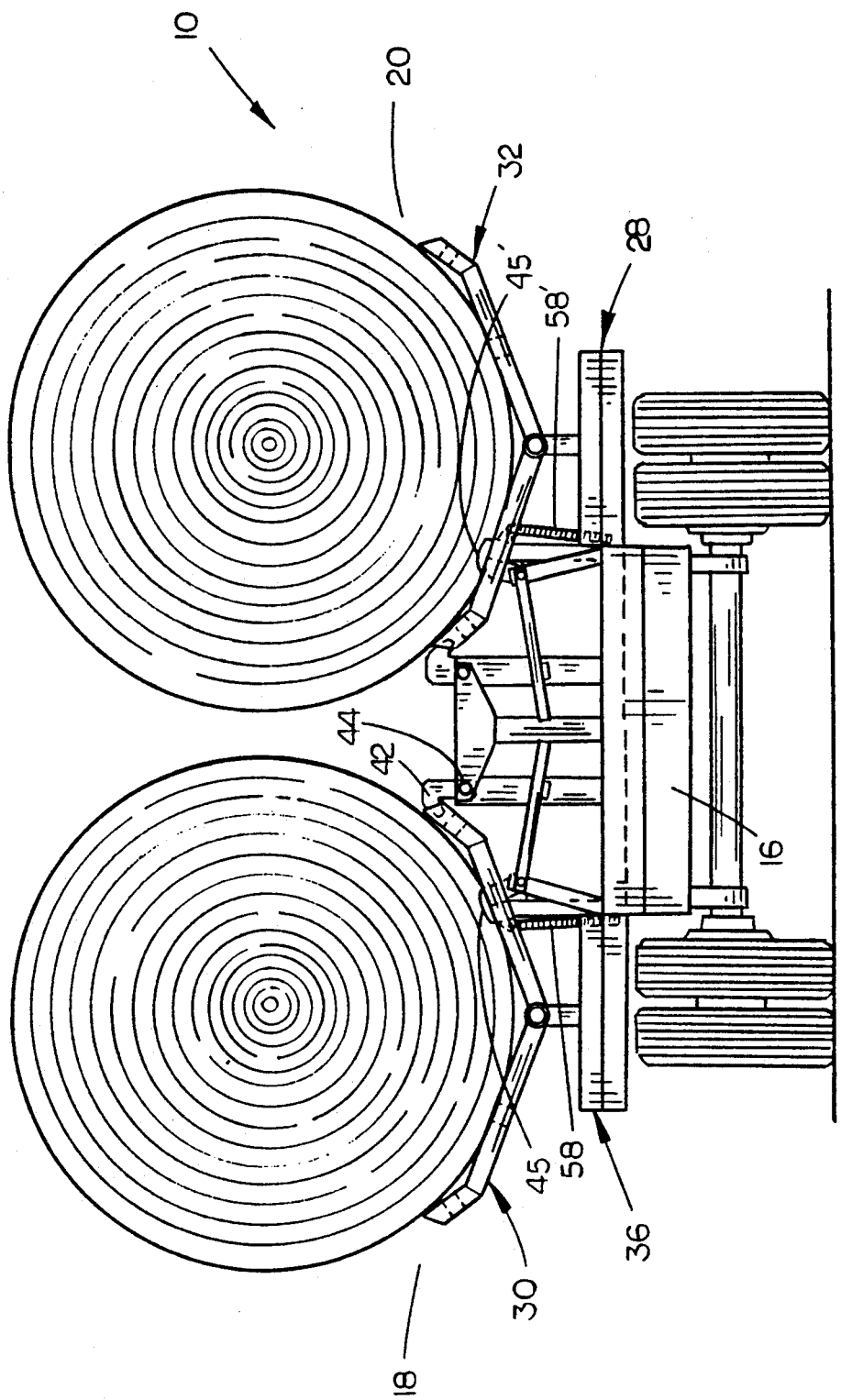
FIG. 3 is a rear view of the bale carrier of this invention.
Figure 4:
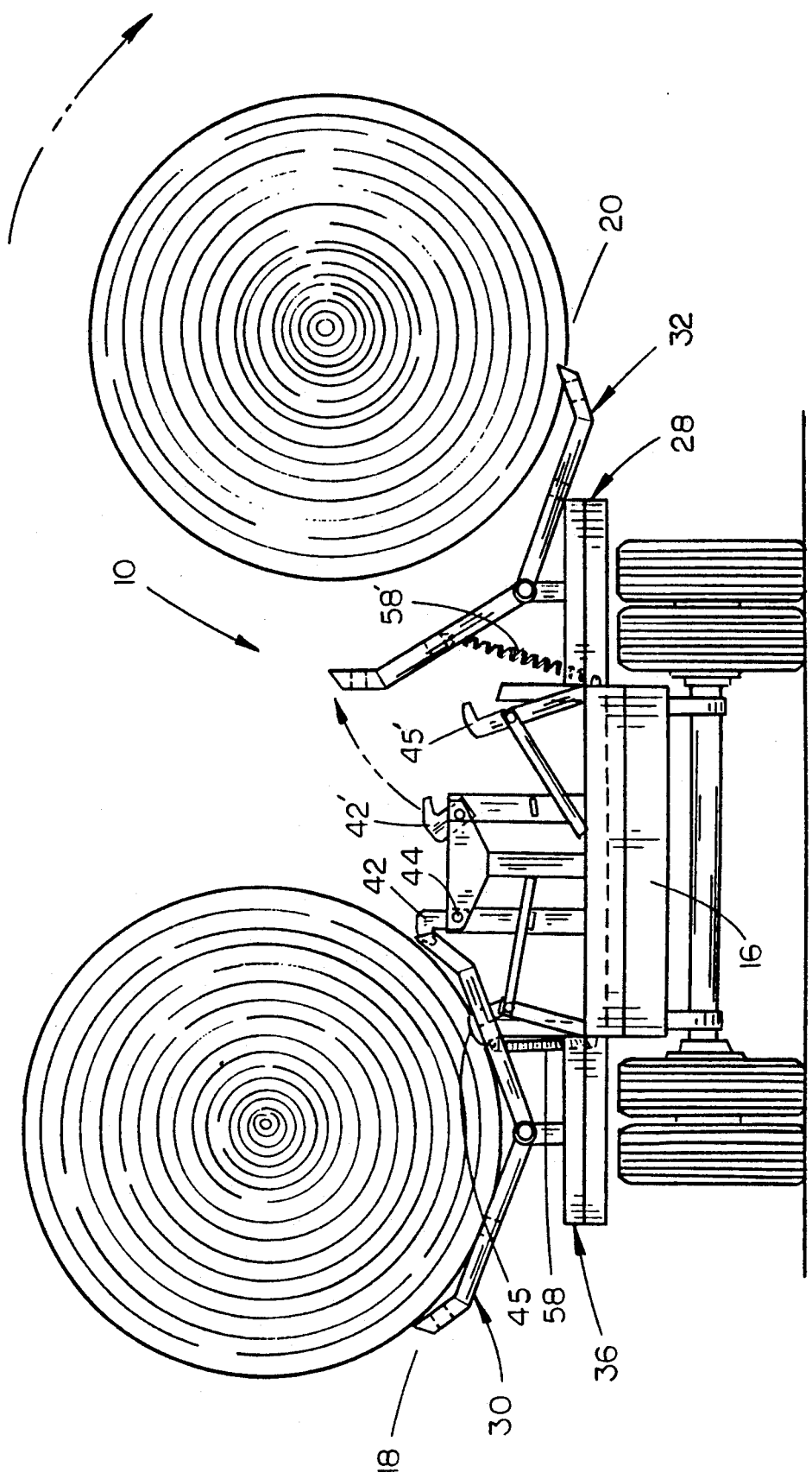
FIG. 4 is a view similar to FIG. 3 except that one of the bale cradles has been pivoted to its dumping position.

The bale carrier of this invention is referred to generally by the reference numeral 10. It should be noted that the bale carrier 10 in the drawings is illustrated as comprising a trailer. However, the bale handling apparatus of this invention could be mounted on a truck or the like if so desired. Bale carrier 10 includes a wheeled frame means 12 having a forward end 14, a rearward end 16, and opposite sides 18 and 20.

Wheeled frame means 12 includes a pair of longitudinally extending frame members 22 and 24. A first row of bale cradles 26 is provided adjacent side 18 while a second row of bale cradles 28 is provided adjacent side 20. Row 26 includes a plurality of bale cradles 30 while row 28 includes a plurality of bale cradles 32. Inasmuch as the bale cradles 30 and 32 are identical, only bale cradles 30 will be described in detail.

Figure 5:
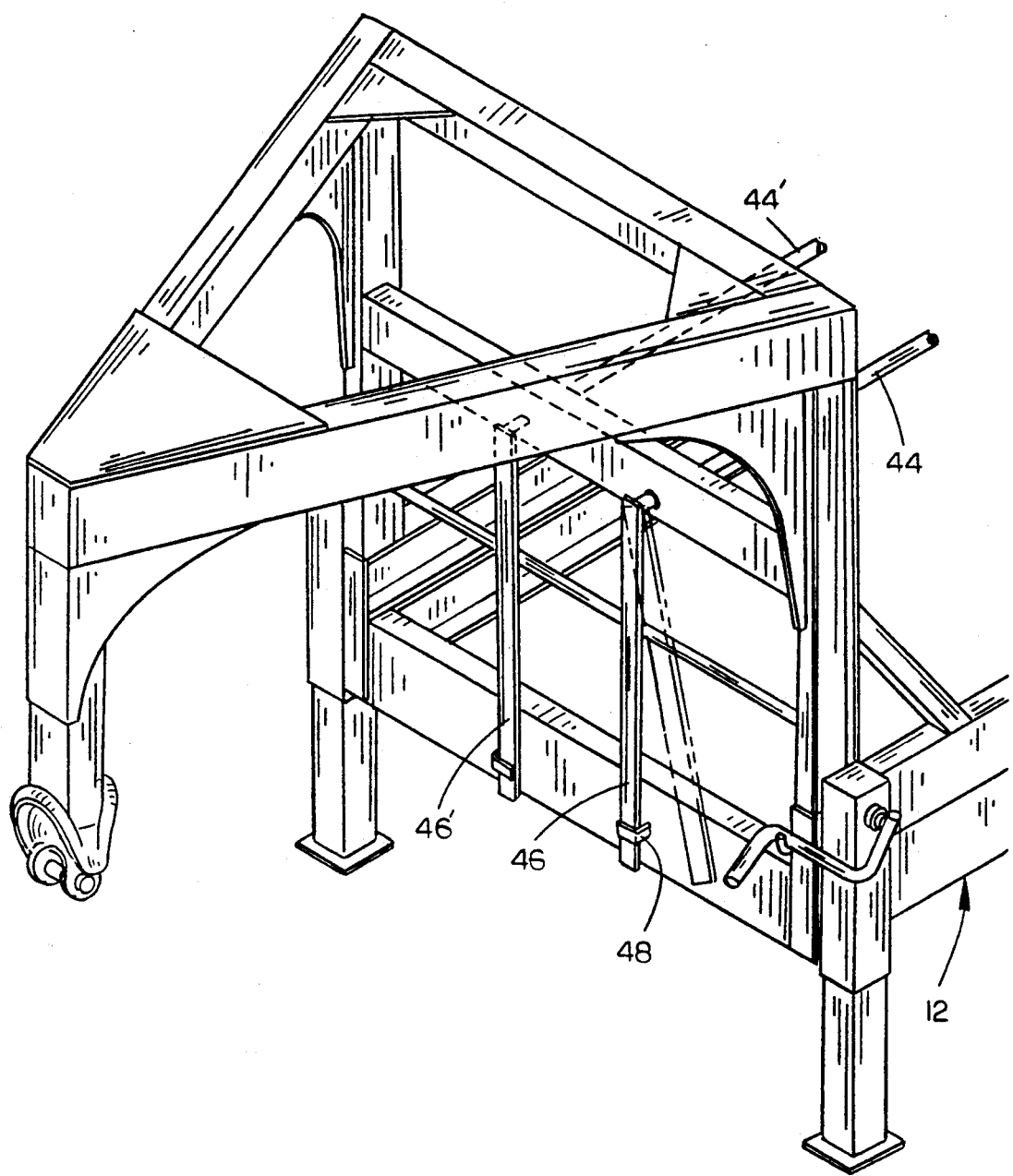
FIG. 5 is a front prospective view of the bale carrier of this invention.
Figure 6:
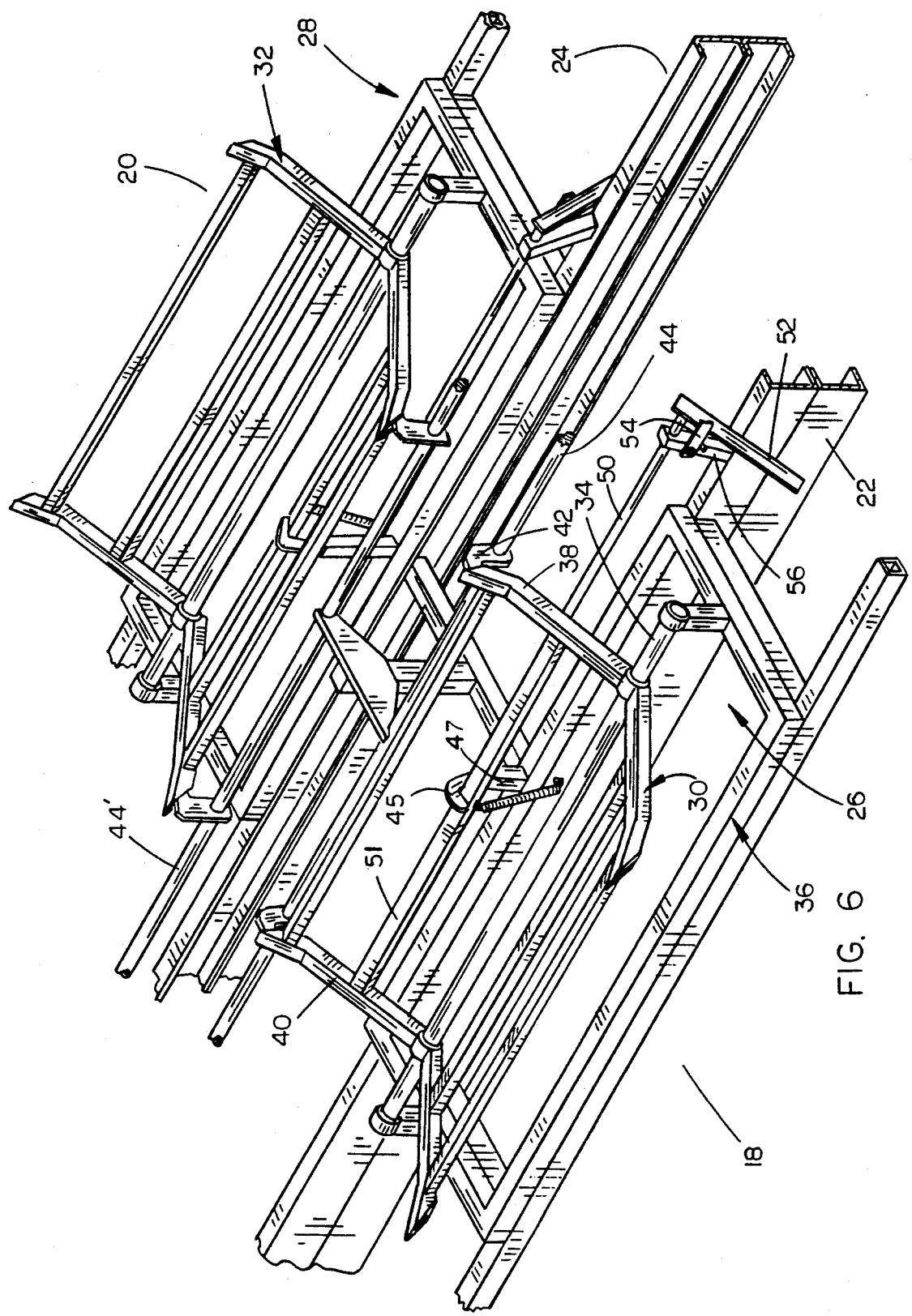
FIG. 6 is a partial rear perspective view of the bale carrier of this invention.
Figure 7:
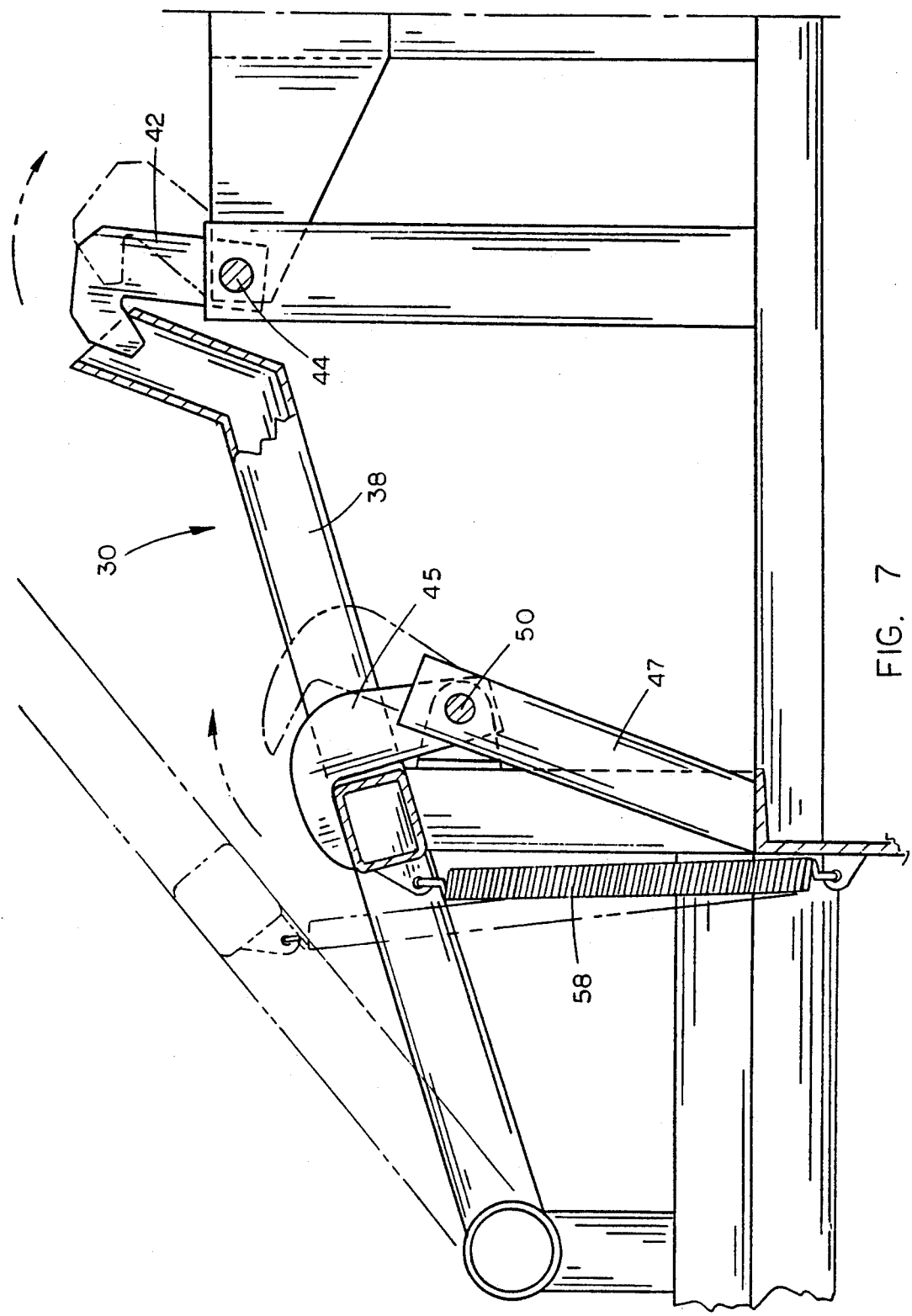
FIG. 7 is a partial sectional view illustrating the manner in which the latching devices function.

Each of the bale cradles 30 include a horizontally extending shaft 34 which is pivotally or rotatably mounted on a frame means 36 as illustrated in FIG. 6. V-shaped cradle arms 38 and 40 are secured to shaft 34 for pivotal movement therewith. The inner ends of the cradle arms 38 and 40 are hollow and are adapted to receive the latches 42 therein. Each of the latches 42 are mounted on a longitudinally extending shaft 44, the forward end of which terminates adjacent the front end of the bale carrier as illustrated in FIG. 5. An arm 46 is secured to the forward end of shaft 44 and is adapted to be positioned in the locked position illustrated by solid lines in FIG. 5 and being movable to the unlocked position as illustrated by broken lines in FIG. 5. Bracket 48 maintains the arm 46 in its latched position as illustrated in FIG. 5. Thus, when the arm 46 is in its latched position, all of the latches 42 are in engagement with the inner ends of the cradle arms 38 and 40 to positively ensure that the cradle will not pivot to its dumping position.

Each of the cradles 30 is also provided with a latch 45 which is pivotally connected to the upper end of an arm 47 at 50. Latch 45 is adapted to extend over the frame member 51 which extends between cradle arms 38 and 40 as illustrated in FIG. 6. Shaft 50 extends rearwardly from latch 45 and has a handle 52 mounted thereon as illustrated in FIG. 6. Handle 52 is positioned between the rearward end of one of the bale cradles 30 and the forward end of the bale cradle 30 positioned rearwardly thereof. Locking arm 54 is pivotally connected to upstanding post 56 and may be pivotally moved over the upper end of handle 52 to maintain handle 52 in its latched position. Spring 58 is connected to each of the frame members 48 to yieldably maintain the bale cradle 30 in its normal bale supporting position of FIG. 6.

When it is desired to transport bales from one location to another, the locking arms 46 and 46' would be in the locked position as illustrated in FIG. 5 so that the latches 42 are in engagement with the inner ends of the cradle arms in the cradles 30 and 32. The latches 45 will also be in the latched position as illustrated in FIG. 6. Thus, the bale cradles are maintained in their bale supporting position by a double latch system.

When the bale carrier has been transported to the location where the bales are to be dumped for feeding or the like, the operator will initially unlatch either the arm 46 or the arm 46' depending upon from which side the bales are to be dumped. Assuming that the bales are to be dumped from side 18, arm 46 will be moved from the position illustrated by solid lines in FIG. 5 to the position illustrated by broken lines in FIG. 5 thereby pivotally moving the latches 42 out of engagement with the inner ends of the cradle arms 38 and 40 of each of the cradles 30. The operator will then walk to the rear of the carrier and will then unlatch the locking arm 54 from the rearward-most handle 52. Handle 52 will then be pivotally moved in a clockwise direction as viewed in FIG. 6 so that latch 46 will disengage from the frame member 48. The operator will then simply apply a certain amount of outward pressure to the bale on the cradle 30 which will cause the cradle 30 to pivotally move from its bale supporting position to its dumping position. When the bale has been dumped from one bale cradle 30, the operator will then walk forwardly to the next bale cradle and will then unlock the locking arm 54 to permit the handle 52 on that particular bale cradle to be moved to its unlatched position.

This procedure is continued as desired until the desired number of bales are dumped from the apparatus. The procedure will be repeated to dump the bales from the other side of the carrier.

Thus it can be seen that a novel bale carrier has been provided which permits a pair of rows of bales to be transported in a safe and efficient manner.

It can therefore be seen that the invention accomplishes at least all of its stated objectives.

I claim:

1. A hay bale handling apparatus, comprising,
a frame means having a forward end, a rearward end, and opposite sides;
a first row of bale cradles individually pivotally mounted, about a horizontal axis, on said frame means at one side thereof;
a second row of bale cradles individually pivotally mounted, about a horizontal axis, on said frame means at the other side thereof;
each of said bale cradles in said first row being individually pivotally movable from a normal bale supporting position to a first dumping position whereby the hay bale thereon may be dumped therefrom along said one side of said frame means;
each of said bale cradles in said second row being individually pivotally movable from a normal bale supporting position to a first dumping position whereby the hay bale thereon may be dumped therefrom along said other side of said frame means;
a plurality of first safety latches mounted on said frame means adjacent said first row of bale cradles, each of said first safety latches being movable between unlatched and latched positions, each of said first safety latches, when in its said latched position, engaging one of said bale cradles in said first row of bale cradles to maintain said bale cradle in its said bale supporting position;
a plurality of second safety latches mounted on said frame means adjacent said second row of bale cradles, each of said second safety latches being movable between unlatched and latched positions, each of said second safety latches when in its said latched position, engaging one of said bale cradles in said second row of bale cradles to maintain said bale cradle in its said bale supporting position;
a plurality of third safety latches mounted on said frame means adjacent said first row of bale cradles, each of said third safety latches being movable between latched and unlatched positions, each of said third safety latches, when in its said latched position, engaging one of said bale cradles in said first row of bale cradles to maintain said bale cradle in its said bale supporting position;
a plurality of fourth safety latches mounted on said frame means adjacent said second row of bale cradles, each of said fourth safety latches being movable between latched and unlatched positions, each of said fourth safety latches, when in its said latched position, engaging one of said bale cradles in said second row of bale cradles to maintain said bale cradle in its said bale supporting position;
each of said plurality of first safety latches being operatively interconnected so that all of said plurality of first safety latches may be simultaneously moved together between their said latched and unlatched positions, and wherein each of said second plurality of latches are operatively interconnected so that all of said plurality of second safety latches may be simultaneously moved together between their said latched and unlatched positions.

2. A hay bale handling apparatus, comprising,
a frame means having a forward end, a rearward end, and opposite sides;
a first row of bale cradles individually pivotally mounted, about a horizontal axis, on said frame means at one side thereof;
a second row of bale cradles individually pivotally mounted, about a horizontal axis, on said frame means at the other side thereof;
each of said bale cradles in said first row being individually pivotally movable from a normal bale supporting position to a first dumping position whereby the hay bale thereon may be dumped therefrom along said one side of said frame means;
each of said bale cradles in said second row being individually pivotally movable from a normal bale supporting position to a first dumping position whereby the hay bale thereon may be dumped therefrom along said other side of said frame means;

a plurality of first safety latches mounted on said frame means adjacent said first row of bale cradles, each of said first safety latches being movable between unlatched and latched positions, each of said first safety latches, when in its said latched position, engaging one of said bale cradles in said first row of bale cradles to maintain said bale cradle in its said bale supporting position;

a plurality of second safety latches mounted on said frame means adjacent said second row of bale cradles, each of said second safety latches being movable between unlatched and latched positions, each of said second safety latches when in its said latched position, engaging one of said bale cradles in said second row of bale cradles to maintain said bale cradle in its said bale supporting position;

a plurality of third safety latches mounted on said frame means adjacent said first row of bale cradles, each of said third safety latches being movable between latched and unlatched positions, each of said third safety latches, when in its said latched position, engaging one of said bale cradles in said first row of bale cradles to maintain said bale cradle in its said bale supporting position;

a plurality of fourth safety latches mounted on said frame means adjacent said second row of bale cradles, each of said fourth safety latches being movable between latched and unlatched positions, each of said fourth safety latches, when in its said latched position, engaging one of said bale cradles in said second row of bale cradles to maintain said bale cradle in its said bale supporting position;

each of said first, second, third and fourth safety latches comprising a hook means which engages a portion of its associated bale cradle to prevent the pivotal movement thereof;

and wherein said plurality of first safety latches are movable as a unit, and wherein said plurality of second safety latches are movable as a unit.

3. The hay bale handling apparatus of claim 1 wherein each of said plurality of third safety latches and each of said plurality of fourth safety latches are individually actuated.

4. The hay bale handling apparatus of claim 1 wherein said first safety latches are mounted on a first longitudinally extending shaft means which is rotatably mounted on said frame means, said first shaft means having a forward end positioned at the forward end of said frame means, said first shaft means being selectively movable between a first position wherein said first latches are in their said latched positions to a second position wherein said first latches are in their said unlatched positions, said second safety latches being mounted on a second longitudinally extending shaft means rotatably mounted on said frame means, said second shaft means having a forward end positioned adjacent the forward end of said frame means, said second shaft means being selectively movable between a first position wherein said second safety latches are in their said latched positions to a second position wherein said second latches are in their said unlatched positions, and means connected to each of said first and second shaft means for selectively maintaining said first and second shaft means in their said first positions.

5. The hay bale handling apparatus of claim 4 wherein said means connected to said first and second shaft means is located at the forward end of said first and second shaft means.

* * * * *